(12) United States Patent
Hou et al.

(10) Patent No.: US 10,979,138 B2
(45) Date of Patent: Apr. 13, 2021

(54) PROTECTION GROUP SUPERPOSITION SWITCHING METHOD, CONTROL APPARATUS, AND OPTICAL COMMUNICATION DEVICE

(71) Applicant: SINO-TELECOM TECHNOLOGY CO., INC., Shanghai (CN)

(72) Inventors: Lei Hou, Shanghai (CN); Zhiyuan Wu, Shanghai (CN); Hu Xie, Shanghai (CN); Lin Li, Shanghai (CN)

(73) Assignee: SINO-TELECOM TECHNOLOGY CO., INC., Shanghai (CN)

(*) Notice: Subject to any disclaimer, the term of this patent is extended or adjusted under 35 U.S.C. 154(b) by 0 days.

(21) Appl. No.: 16/326,527

(22) PCT Filed: Jun. 21, 2018

(86) PCT No.: PCT/CN2018/092103
§ 371 (c)(1),
(2) Date: Feb. 19, 2019

(87) PCT Pub. No.: WO2019/100706
PCT Pub. Date: May 31, 2019

(65) Prior Publication Data
US 2020/0382209 A1    Dec. 3, 2020

(30) Foreign Application Priority Data

Nov. 22, 2017 (CN) .......................... 201711175790.7

(51) Int. Cl.
*H04B 10/032* (2013.01)
*H04J 14/02* (2006.01)
*H04Q 11/00* (2006.01)

(52) U.S. Cl.
CPC ....... *H04B 10/032* (2013.01); *H04Q 11/0005* (2013.01); *H04J 2203/0041* (2013.01)

(58) Field of Classification Search
CPC ............... H04B 10/32; H04J 2203/006; H04J 2203/0021; H04Q 11/0043;
(Continued)

(56) References Cited

U.S. PATENT DOCUMENTS

| 2003/0041208 A1* | 2/2003 | Volkmar | ............... | H04L 49/552 |
| | | | | 710/316 |
| 2005/0122899 A1* | 6/2005 | DeBoer | ................... | H04L 45/22 |
| | | | | 370/222 |

(Continued)

FOREIGN PATENT DOCUMENTS

| CN | 1595878 A | 3/2005 |
| CN | 1617476 A | 5/2005 |

(Continued)

*Primary Examiner* — Nathan M Cors
(74) *Attorney, Agent, or Firm* — Global IP Services; Tianhua Gu

(57) ABSTRACT

The present disclosure provides a protection group superposition switching method, a control apparatus, and an optical communication device. Multiple protection state machines are implemented by using a field programmable gate array (FPGA). Each protection state machine independently performs an automatic protection switching (APS) protocol operation for at least one protection group that is pre-associated with the protection state machine. At least one protection status table for recording a status of each protection group is updated according to a result of the APS protocol operation, and a cross-connection table for traffic cross-connection between communication units is updated according to the protection status table; the updated cross-connection table is configured into a cross-connection chip, so that the cross-connection chip performs traffic cross-connection according to the updated cross-connection table.

15 Claims, 7 Drawing Sheets

(58) Field of Classification Search
CPC ... H04Q 2011/0069; H04Q 2011/0073; H04Q 2011/0081
See application file for complete search history.

(56) References Cited

U.S. PATENT DOCUMENTS

| | | | | |
|---|---|---|---|---|
| 2011/0135305 A1* | 6/2011 | Barnard | ................ | H04L 45/50 398/49 |
| 2014/0233939 A1* | 8/2014 | Gruman | .............. | H04L 43/0811 398/5 |
| 2015/0312658 A1* | 10/2015 | Winzer | ................ | H04L 45/22 398/5 |
| 2015/0365193 A1* | 12/2015 | Connolly | ............ | H04L 41/0803 398/52 |
| 2016/0149802 A1* | 5/2016 | Youn | ........................ | H04J 3/14 398/45 |

FOREIGN PATENT DOCUMENTS

| | | | |
|---|---|---|---|
| CN | 101325599 | A | 12/2008 |
| CN | 101814953 | A | 8/2010 |
| CN | 101926116 | A | 12/2010 |
| CN | 102143076 | A | 8/2011 |
| CN | 102523160 | A | 6/2012 |
| CN | 102868441 | A | 1/2013 |
| CN | 105577405 | A | 5/2016 |

\* cited by examiner

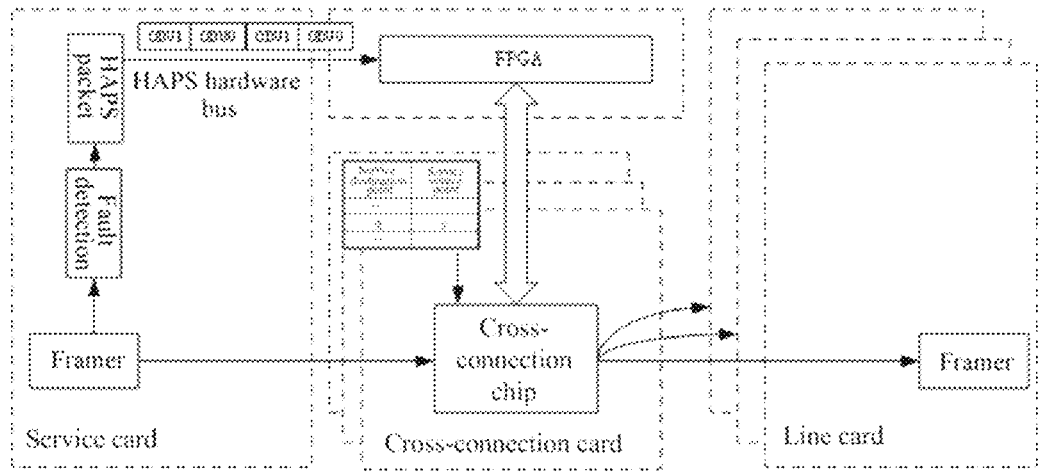

FIG. 7

| each protection state machine independently performs an automatic protection switching protocol operation for the at least one protection group pre-associated with the protection state machine | S1 |

↓

| An FPGA updates, according to a result of the automatic protection switching protocol operation, at least one protection status table for recording a status of each protection group, and updates, according to the protection status table, a cross-connection table for traffic cross-connection between communication units | S2 |

↓

| The FGPA configures the updated cross-connection table into the cross-connection chip, so that the cross-connection chip performs traffic cross-connection according to the updated cross-connection table | S3 |

FIG.8

| Cross-connection No. | Source point | Destination point |
|---|---|---|
| 1 | A | B |
| 2 | B | A |
| 3 | | |
| | | |

FIG. 9

| Lower order protection group No. | Working channel | Protection channel | Switching status |
|---|---|---|---|
| 1 | A | a | Working channel |
| 2 | B | b | Protection channel |
| 3 | ...... | ...... | ...... |
| 4 | ...... | ...... | ...... |

FIG. 10

| Higher order protection group No. | Working channel | Protection channel | Switching status |
|---|---|---|---|
| 1 | A | A' | Working channel |
| 2 | a | a' | Protection channel |
| 3 | B | B' | Protection channel |
| 4 | b | b' | Working channel |

FIG. 11

| Cross connection table | | Lower order protection status table | | | | Higher order protection status table | | | | Operation result | |
|---|---|---|---|---|---|---|---|---|---|---|---|
| Destination point | Source point | Lower order protection group No | Working channel | Protection channel | Switching status | Higher order protection group No | Working channel | Protection channel | Switching status | Logic destination point | Logic source point |
| A | B | 1 | A | a | Working channel | 1 | A | A' | Working channel | A | b |
| ... | ... | 2 | B | b | Protection channel | 4 | b | b' | Working channel | ... | ... |

FIG. 12

PROTECTION GROUP SUPERPOSITION SWITCHING METHOD, CONTROL APPARATUS, AND OPTICAL COMMUNICATION DEVICE

CROSS REFERENCE TO RELATED PATENT APPLICATION

The present application is the US national stage of PCT/CN2018/092103 filed on Jun. 21, 2018, which claims the priority of the Chinese patent application No. CN2017111757907 filed on Nov. 22, 2017, which application is incorporated herein by reference.

BACKGROUND OF THE PRESENT INVENTION

Field of Invention

The present disclosure relates to optical transport network technologies, and in particular, to a protection group superposition switching method, a control apparatus, and an optical communication device.

Description of Related Arts

OTN (Optical Transport Network, OTN) is widely used in backbone transport networks. The OTN is based on a wavelength division multiplexing (WDM) technology, is fully backward compatible, and can be converged with optical synchronous digital hierarchy (SDH) and WDM devices in an existing network to provide large-granularity multiplexing, cross-connection, and configuration, thereby significantly improving adaptation to high-bandwidth data and transport efficiency of the transport network. Meanwhile, an OTN device also provides a flexible traffic protection function based on electrical layer and optical layer, for example, subnetwork connection protection (SNCP) and shared ring protection based on an optical path data unit-k (ODUk) layer. An optical transmission device supporting the traffic protection function can switch traffic to a spare channel when equipment failure occur in the network (such as fiber break or error signal), thereby providing an automatic traffic recovery capability.

Numerous traffic will be interrupted if a fiber of an OTN network carrying tens of Gigabits or even Terabits per second is destroyed. Therefore, it is necessary to improve the viability of optical transport network. One measurement index of the network viability is switching performance. It is generally stipulated in the industry that traffic recovery time (within which interaction of all APS bytes related to protection switching and a protection switching operation of each node are completed) should be less than 50 milliseconds, so as to ensure that users will not feel any influence from the protection switching during a call.

In an actual network environment, different layers of protection are usually configured for some important traffic, and when protection at one level fails, other protection channels are available to protect the traffic to ensure that the important traffic are not interrupted. Therefore, multiple protection groups superimpose. A working or protection channel of one protection group may also be a working or protection channel of another protection group, and how to perform traffic switching correctly becomes a problem. In addition, when multiple protection groups are superimposed, protection switching processing of the protection groups at different levels is usually executed in series to prevent that one fault causes simultaneous switching of the protection groups. In other words, a primary protection group is switched first, and a waiting time is set for other protection groups. In the waiting time, the fault does not trigger protection switching of other protection groups. It can be seen that when the primary protection group fails, due to the presence of the waiting time, a total time for protection switching increases linearly as more layers of protection groups are superimposed. The total time for protection switching is long, which fails to meet the requirement that the traffic recovery time should be less than 50 milliseconds.

SUMMARY OF THE PRESENT DISCLOSURE

In view of the disadvantages of the prior art, an object of the present disclosure is to provide a protection group superposition switching method, a control apparatus and an optical communication device, so as to resolve the problem in the prior art.

In order to accomplish the foregoing object and other related objects, the present disclosure provides a protection group superposition switching method implemented in a field programmable gate array (FPGA). The FPGA is communicatively connected to a cross-connection chip and a plurality of optical communication units in an optical communication device. The cross-connection chip is configured to perform traffic cross-connection for the plurality of optical communication units. A plurality of protection groups are formed between the plurality of communication units and each of the communication units of other optical communication devices. The protection groups comprise higher order protection group and lower order protection group. The lower order protection group and the higher order protection group are superimposed to protect the same traffic, and the higher order protection group has priority over the lower order protection group. The FPGA communicates with the plurality of protection state machines, and each protection state machine is associated with at least one of the protection groups. The method comprises: independently performing, by each protection state machine, an automatic protection switching (APS) protocol operation for the at least one protection group that is pre-associated with the protection state machine; updating, according to a result of the APS protocol operation, at least one protection status table for recording a status of each protection group, and updating, according to the protection status table, a cross-connection table for traffic cross-connection between communication units; and configuring the updated cross-connection table into the cross-connection chip, so that the cross-connection chip performs traffic cross-connection according to the updated cross-connection table.

In an embodiment of the present disclosure, the cross-connection table stores a plurality of cross-connection records, each cross-connection record corresponds to traffic from a source point to a destination point. The source point and the destination point are communication units. The cross-connection record comprises a source point field and a corresponding destination point field. Content of the source point field is index information of the source point, and content of the destination point field is index information of the destination point. The protection status table stores protection group records of higher order protection groups and lower order protection groups related to source points and destination points of at least some of traffic. Each higher order or lower order protection group comprises a working channel and a protection channel. Each protection group record comprises a working channel field, a protection channel field, and a protection switching status field of a protection group. Content of the working channel field and content of the protection channel field are indexes of communication units corresponding to the working channel and the protection channel, respectively. Content of the protection switching status field is information that the corresponding protection group works on the working channel or the protection channel.

In an embodiment of the present disclosure, a method for updating the cross-connection table comprises: performing the following processing corresponding to each cross-connection record in the cross-connection table: step S10, checking an index of a destination point in the content of the destination point field in the cross-connection record; step S20, checking whether the destination point in step S10 belongs to a higher order protection group; step S30, if the destination point in step S10 does not belong to any higher order protection group, setting the destination point as a logic destination point, and proceeding to step S60 to continue processing; step S40, if the destination point in step S10 belongs to a higher order protection group and the index of the destination point is the same as the content of the working channel field of the higher order protection group, setting the destination point as a logic destination point, and proceeding to step S60 to continue processing; step S50, if the destination point in step S10 belongs to a higher order protection group and the index of the destination point is the same as the content of the protection channel field of the higher order protection group, setting the communication unit corresponding to the working channel in the higher order protection group as a logic destination point according to the protection status table, and proceeding to step S60 to continue processing; step S60, checking whether the logic destination point in step S30, step S40 or step S50 belongs to a lower order protection group; step S70, if the logic destination point in step S30, step S40 or step S50 does not belong to any lower order protection group, keeping the logic destination point unchanged, and proceeding to step S100 to continue processing; step S80, if the logic destination point in step S30, step S40 or step S50 belongs to a lower order protection group and the index of the logic destination point is the same as the content of the working channel field of the lower order protection group, keeping the logic destination point unchanged, and proceeding to step S100 to continue processing; step S90, if the logic destination point in step S30, step S40 or step S50 belongs to a lower order protection group and the index of the logic destination point is the same as the content of the protection channel field of the lower order protection group, setting the communication unit corresponding to the working channel in the lower order protection group as a logic destination point, and proceeding to step S100 to continue processing; step S100, checking whether the logic destination point specified in step S70, step S80 or step S90 is the same as the destination point of any cross-connection record in the cross-connection table; step S110, if the logic destination point in step S70, step S80 or step S90 is not the same as the destination point of any cross-connection record, returning to step S10 to continue to process a next cross-connection record without updating the cross-connection table; step S120, if the logic destination point in step S70, step S80 or step S90 is the same as the destination point of a particular cross-connection record, setting the source point in the particular cross-connection record as a logic source point, and proceeding to step S130 to continue processing; step S130, checking whether the logic source point in step S120 belongs to a lower order protection group; step S140, if the logic source point in step S120 does not belong to any lower order protection group, keeping the logic source point unchanged, and proceeding to step S170 to continue processing; step S150, if the logic source point in step S120 belongs to a lower order protection group and the traffic of the lower order protection group is passing through a working channel or protection channel corresponding to the logic source point in step S120, keeping the logic source point unchanged, and proceeding to step S170 to continue processing; step S160, if the logic source point in step S120 belongs to a lower order protection group but the traffic of the lower order protection group does not pass through the working channel or protection channel corresponding to the logic source point in step S120, setting a communication unit corresponding to a working channel or protection channel currently used by the traffic of the lower order protection group as a logic source point, and proceeding to step S170 to continue processing; step S170, checking whether the logic source point in step S140, step S150 or step S160 belongs to a higher order protection group; step S180, if the logic source point in step S140, step S150 or step S160 does not belong to any higher order protection group, keeping the logic source point unchanged, and proceeding to step S210 to continue processing; step S190, if the logic source point in step S140, step S150 or step S160 belongs to a higher order protection group and the traffic of the higher order protection group is passing through a working channel or protection channel corresponding to the logic source point specified in step S140, step S150 or step S160, keeping the logic source point unchanged, and proceeding to step S210 to continue processing; step S200, if the logic source point in step S140, step S150 or step S160 belongs to a higher order protection group but the traffic of the higher order protection group does not pass through the working channel or protection channel corresponding to the logic source point in step S140, step S150 or step S160, setting a communication unit corresponding to a working channel or protection channel that the higher order protection group currently works on as a logic source point, and proceeding to step S210 to continue processing; and step S210, using the logic source point specified in step S180, step S190 or step S200 as an actual source point corresponding to the destination point in step S10, and updating the corresponding cross-connection record in the cross-connection table according to the actual source point.

In an embodiment of the present disclosure, the result of the APS protocol operation comprises: a protection switching state of each protection group; a transmitting APS byte to be sent to a remote network element device and representing that an APS byte protocol state of a local network element device has been updated; and a switching result of a protection switching operation that needs to be performed on traffic affected by a fault.

In an embodiment of the present disclosure, the protection state machines separately look up one or more pre-stored tables for APS protocol operation results pre-associated with switching trigger conditions that possibly affect the related protection groups.

In an embodiment of the present disclosure, the protection group superposition switching method comprises: detecting, by the FPGA, switching trigger information of a plurality of communication units, obtaining related traffic information when the switching trigger information is detected, and sending a packet through a hardware bus to inform a protection state machine corresponding to a protection group related to the traffic information, so that the protection state machine performs the APS protocol operation by using a switching trigger condition obtained according to the switching trigger information.

In an embodiment of the present disclosure, the switching trigger information comprises: fault state information or APS byte information that has been changed.

In an embodiment of the present disclosure, the optical communication device is a framer.

The present disclosure provides a control apparatus for protection group superposition switching, comprising: an FPGA. The FPGA is communicatively connected to a cross-connection chip and a plurality of optical communication units in an optical communication device. The cross-connection chip is configured to perform traffic cross-connection for the plurality of optical communication units. A plurality of protection groups are formed between the plurality of communication units and each of the communication units of other optical communication devices. The protection groups comprise higher order protection group and lower order protection group. The lower order protection group and the higher order protection group are superimposed to protect the same traffic, and the higher order protection group has priority over the lower order protection group. The FPGA communicates with the plurality of protection state machines, and each protection state machine is associated with at least one of the protection groups. Each protection state machine independently performs an APS protocol operation for the at least one protection group that is pre-associated with the protection state machine; updates, according to a result of the APS protocol operation, at least one protection status table for recording a status of each protection group, and updates, according to the protection status table, a cross-connection table for traffic cross-connection between communication units; and configures the updated cross-connection table into the cross-connect chip, so that the cross-connect chip performs traffic cross-connection according to the updated cross-connection table.

In an embodiment of the present disclosure, the cross-connection table stores a plurality of cross-connection records, and each cross-connection record corresponds to traffic from a source point to a destination point. The source point and the destination point are communication units. The cross-connection record comprises a source point field and a corresponding destination point field. Content of the source point field is index information of the source point, and content of the destination point field is index information of the destination point. The protection status table stores protection group records of higher order protection groups and lower order protection groups related to source points and destination points of at least some of traffic. Each higher order or lower order protection group comprises a working channel and a protection channel. Each protection group record comprises a working channel field, a protection channel field, and a protection switching status field of a protection group. Content of the working channel field and content of the protection channel field are indexes of communication units corresponding to the working channel and the protection channel, respectively. Content of the protection switching status field is information that the corresponding protection group works on the working channel or the protection channel.

In an embodiment of the present disclosure, a method for updating the cross-connection table comprises: performing the following processing corresponding to each cross-connection record in the cross-connection table: step S10, checking an index of a destination point in the content of the destination point field in the cross-connection record; step S20, checking whether the destination point in step S10 belongs to a higher order protection group; step S30, if the destination point in step S10 does not belong to any higher order protection group, setting the destination point as a logic destination point, and proceeding to step S60 to continue processing; step S40, if the destination point in step S10 belongs to a higher order protection group and the index of the destination point is the same as the content of the working channel field of the higher order protection group, setting the destination point as a logic destination point, and proceeding to step S60 to continue processing; step S50, if the destination point in step S10 belongs to a higher order protection group and the index of the destination point is the same as the content of the protection channel field of the higher order protection group, setting the communication unit corresponding to the working channel in the higher order protection group as a logic destination point according to the protection status table, and proceeding to step S60 to continue processing; step S60, checking whether the logic destination point in step S30, step S40 or step S50 belongs to a lower order protection group; step S70, if the logic destination point in step S30, step S40 or step S50 does not belong to any lower order protection group, keeping the logic destination point unchanged, and proceeding to step S100 to continue processing; step S80, if the logic destination point in step S30, step S40 or step S50 belongs to a lower order protection group and the index of the logic destination point is the same as the content of the working channel field of the lower order protection group, keeping the logic destination point unchanged, and proceeding to step S100 to continue processing; step S90, if the logic destination point in step S30, step S40 or step S50 belongs to a lower order protection group and the index of the logic destination point is the same as the content of the protection channel field of the lower order protection group, setting the communication unit corresponding to the working channel in the lower order protection group as a logic destination point, and proceeding to step S100 to continue processing; step S100, checking whether the logic destination point in step S70, step S80 or step S90 is the same as the destination point of any cross-connection record in the cross-connection table; step S110, if the logic destination point in step S70, step S80 or step S90 is not the same as the destination point of any cross-connection record, and returning to step S10 to continue to process a next cross-connection record without updating the cross-connection table; step S120, if the logic destination point in step S70, step S80 or step S90 is the same as the destination point of a particular cross-connection record, setting the source point in the particular cross-connection record as a logic source point, and proceeding to step S130 to continue processing; step S130, checking whether the logic source point in step S120 belongs to a lower order protection group; step S140, if the logic source point in step S120 does not belong to any lower order protection group, keeping the logic source point unchanged, and proceeding to step S170 to continue processing; step S150, if the logic source point in step S120 belongs to a lower order protection group and the traffic of the lower order protection group is passing through a working channel or protection channel corresponding to the logic source point specified in step S120, keeping the logic source point unchanged, and proceeding to step S170 to continue processing; step S160, if the logic source point in step S120 belongs to a lower order protection group but the traffic of the lower order protection group does not pass through the working channel or protection channel corresponding to the logic source point in step S120, setting a communication unit corresponding to a working channel or protection channel currently used by the traffic of the lower order protection group as a logic source point, and proceeding to step S170 to continue processing; step S170, checking whether the logic source point specified in step S140, step S150 or step S160 belongs to a higher order protection group; step S180, if the logic source point specified in step S140, step S150 or step S160 does not belong to any higher order protection group, keeping the logic source point unchanged, and proceeding to step S210 to continue processing; step S190, if the logic source point specified in step S140, step S150 or step S160 belongs to a higher order protection group and the traffic of the higher order protection group is passing through a working channel or protection channel corresponding to the logic source point specified in step S140, step S150 or step S160, keeping the logic source point unchanged, and proceeding to step S210 to continue processing; step S200, if the logic source point specified in step S140, step S150 or step S160 belongs to a higher order protection group but the traffic of the higher order protection group does not pass through the working channel or protection channel corresponding to the logic source point specified in step S140, step S150 or step S160, setting a communication unit corresponding to a working channel or protection channel that the higher order protection group currently works on as a logic source point, and proceeding to step S210 to continue processing; and step S210, using the logic source point specified in step S180, step S190 or step S200 as an actual source point corresponding to the destination point in step S10, and updating the corresponding cross-connection record in the cross-connection table according to the actual source point.

In an embodiment of the present disclosure, the result of the APS protocol operation comprises: a protection switching state of each protection group; a transmitting APS byte to be sent to a remote network element device and representing that an APS byte protocol state of a local network element device has been updated; and a switching result of a protection switching operation that needs to be performed on traffic affected by a fault.

In an embodiment of the present disclosure, the protection state machines separately look up one or more pre-stored tables for APS protocol operation results pre-associated with switching trigger conditions that possibly affect the related protection groups.

In an embodiment of the present disclosure, the FPGA detects switching trigger information of plurality of communication units, obtains related traffic information when the switching trigger information is detected, and sends a packet through a hardware bus to inform a protection state machine corresponding to a protection group related to the traffic information, so that the protection state machine performs the APS protocol operation by using a switching trigger condition obtained according to the switching trigger information.

In an embodiment of the present disclosure, the switching trigger information comprises: fault state information or APS byte information that has been changed.

In an embodiment of the present disclosure, the optical communication device is a framer.

The present disclosure further provides an optical communication device that uses the method described above.

As described above, in the protection group superposition switching method, the control apparatus and the optical communication device consistent with the present disclosure, multiple protection state machines are implemented by using an FPGA. Each protection state machine independently performs an APS protocol operation for at least one protection group that is pre-associated with the protection state machine. At least one protection status table for recording a status of each protection group is updated according to a result of the APS protocol operation, and a cross-connection table for traffic cross-connection between communication units is updated according to the protection status table; the updated cross-connection table is configured into a cross-connection chip, so that the cross-connection chip performs traffic cross-connection according to the updated cross-connection table. In the present disclosure, a protection switching superposition function on hardware is implemented by using an FPGA, and in traffic cross-connection process, a cross-connection chip can use a destination point as an index for reading a protection status table and a cross-connection table, so that a switching time is reduced to several milliseconds, thereby greatly improving the protection switching performance.

BRIEF DESCRIPTION OF THE DRAWINGS

FIG. 7 is a schematic structural diagram of a hardware system for implementing a protection group superposition switching method in an embodiment of the present disclosure.

FIG. 8 is a flowchart of a protection group superposition switching method in an embodiment of the present disclosure.

FIG. 9 is a schematic diagram of a cross-connection table in an embodiment of the present disclosure.

FIG. 10 is a schematic diagram of a lower order protection table in an embodiment of the present disclosure.

FIG. 11 is a schematic diagram of a higher order protection table in an embodiment of the present disclosure.

FIG. 12 is a schematic diagram of a cross-connection table updating operation in an embodiment of the present disclosure.

DETAILED DESCRIPTION OF THE PREFERRED EMBODIMENTS

Implementations of the present disclosure are illustrated below through specific embodiments. Those skilled in the art can easily understand other advantages and efficacy of the present disclosure according to the content disclosed in this specification. The present disclosure can also be implemented or applied through other different specific implementations. Various modifications or variations can also be made on details in this specification based on different opinions and applications without departing from the spirit of the present disclosure. It should be noted that, if not conflicting with each other, the embodiments below and features in the embodiments can be combined.

It should be noted that, the figures provided in the following embodiments merely illustrate the basic conception of the present disclosure schematically. Therefore, the figures only show components related to the present disclosure, and are not drawn according to the quantity, shapes and sizes of components during actual implementation. The pattern, quantity and ratio of components during actual implementation can be changed arbitrarily, and the component layout may also be more complex.

The present disclosure implements a technical solution for improving superposition protection switching performance of an OTN, so that a protection switching superposition function is implemented by hardware and the superposition protection switching performance is greatly improved, thereby increasing viability of the network.

Figure 1:
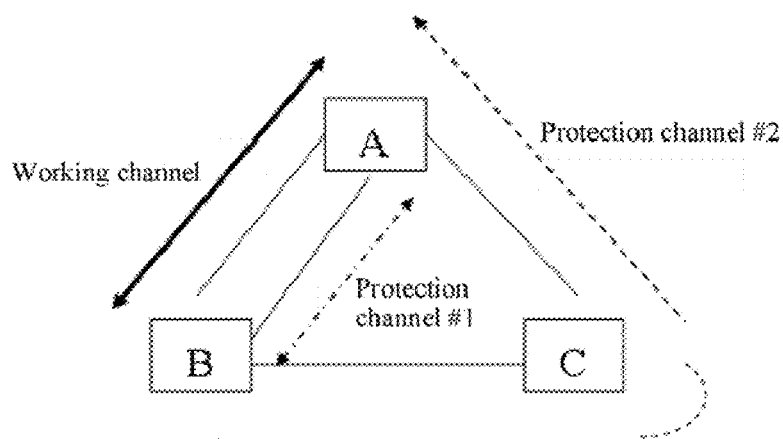
FIG. 1 is a diagram showing directions of working channels and protection channels between OTN devices in an embodiment of the present disclosure.

FIG. 1 is a schematic diagram of a principle for implementing superposition protection in an embodiment of the present disclosure. As shown in the figure, the present disclosure implements protection for an important OTN traffic by using superposition of multiple protection manners. Specifically, the traffic is transmitted through a working path between optical communication devices A and B when an OTN is normal. When a working channel fails, the traffic is automatically switched to a protection channel #1 between A and B. When the working channel and the protection channel #1 between A and B fail at the same time, the traffic is switched to a protection channel #2 that passes through an optical communication device C. As such, higher order protection and lower order protection are superimposed to protect one traffic, thereby enhancing system reliability.

Figure 2:
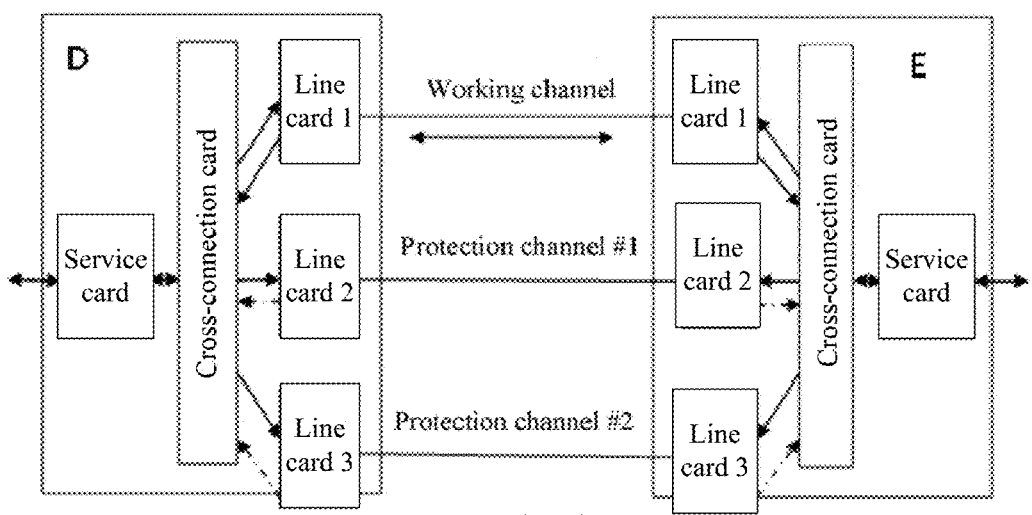
FIG. 2 is a schematic diagram showing that traffic between OTN devices passes through a working channel in an embodiment of the present disclosure.

FIG. 2 shows an embodiment of a communication structure, which comprises optical communication devices (which may be referred to as chassis devices in this embodiment) D and E implemented based on a cross-connection chip solution. Each chassis device comprises a plurality of boards: a traffic card, a cross-connection card and line cards. In an OTN, D is used as a local network element device, and E is used as a remote network element device. A local traffic of the local network element device D is connected to a system through the traffic card, is switched to the line card through the cross-connection card, and is transmitted to the remote network element device E through a fiber. The cross-connection card comprises a traffic cross-connection chip and a protection state machine. Traffic cross-connection configuration and switching computation are both completed in the cross-connection card. Each line card comprises an optical communication unit, such as an OTN framer. An OTN traffic enters the OTN framer through a fiber, so that an optical signal is converted into an electrical signal. Overhead bytes required by a protection protocol are transmitted into a protection state machine for protection computation, and traffic data enters a service cross-connection matrix for switching. In this embodiment, each line card is used as a communication unit of a network element device. A plurality of protection group can be established between the plurality of line cards of the local and remote network element devices, and the protection groups can be superimposed. For example, a line card 1 and a line card 2 in FIG. 2 form a higher order protection group, and traffic on the line card 1 is protected by a protection channel #1 on the line card 2. The line card 1 and a line card 3 form a lower order protection group, and the traffic on the line card 1 can also be protected by a protection channel #2 on the line card 3. A traffic path direction when no failure occurs in the network is shown in FIG. 2. When the higher order protection group and the lower order protection group both provide 1+1 protection, traffic is broadcasted from a traffic card to line cards 1, 2 and 3 in a sending direction, and is received through a working channel on the line card 1 in a receiving direction.

Figure 3:
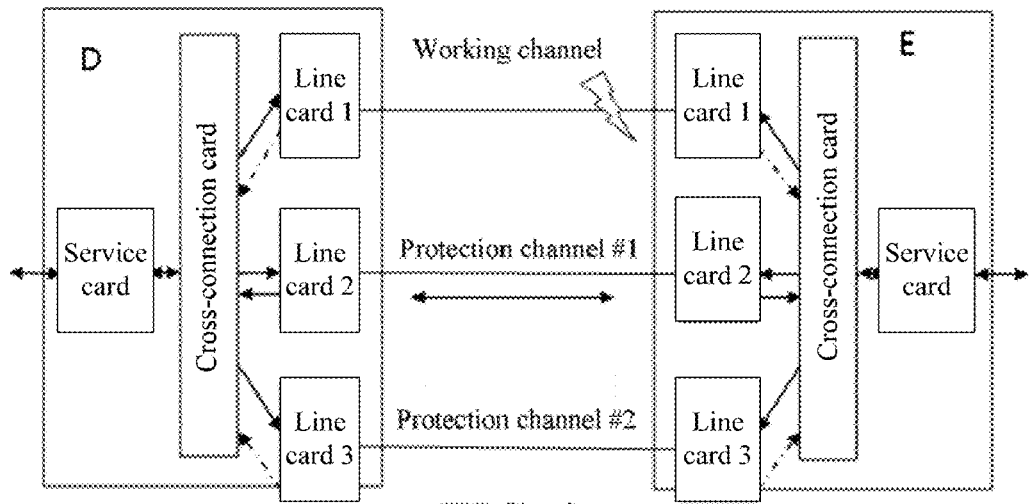
FIG. 3 is a schematic diagram showing that traffic passes through a higher order protection channel after a working channel failure occurs between OTN devices in an embodiment of the present disclosure.

When the working channel fails, the traffic path direction is as shown in FIG. 3. In the sending direction, the traffic is broadcasted from the traffic card to the line cards 1, 2 and 3, in the receiving direction, the traffic is automatically switched to the higher order protection channel #1 on the line card2 to receive traffic.

Figure 4:
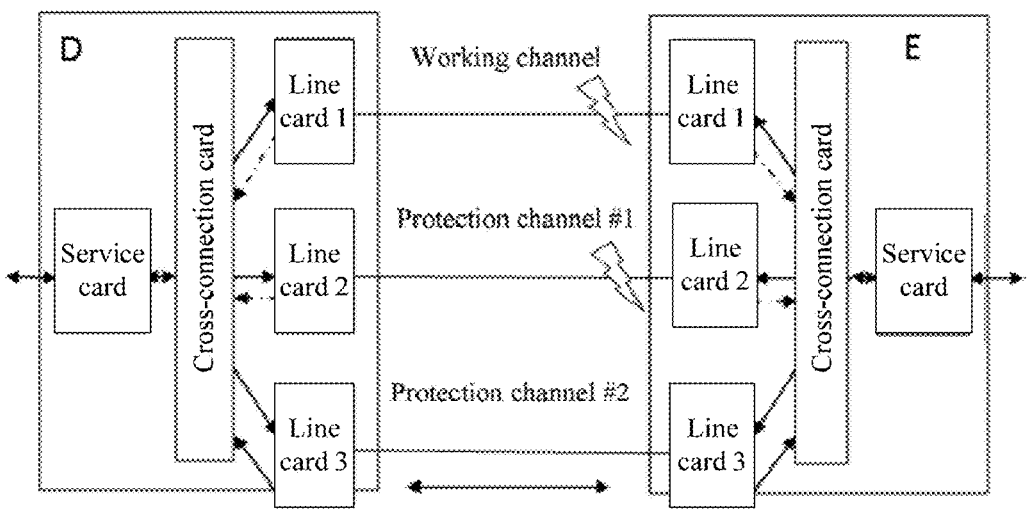
FIG. 4 is a schematic diagram showing that traffic passes through a lower order protection channel after working channel and protection channel of higher order protection between OTN devices detect failure in an embodiment of the present disclosure.

When both the working channel and the protection channel #1 fail, the traffic path direction is as shown in FIG. 4. In the sending direction, the traffic is broadcasted from the traffic card to the line cards 1, 2 and 3, in the receiving direction, the traffic is automatically switched the lower order protection channel #2 on the line card 3 to receive traffic.

Figure 5:
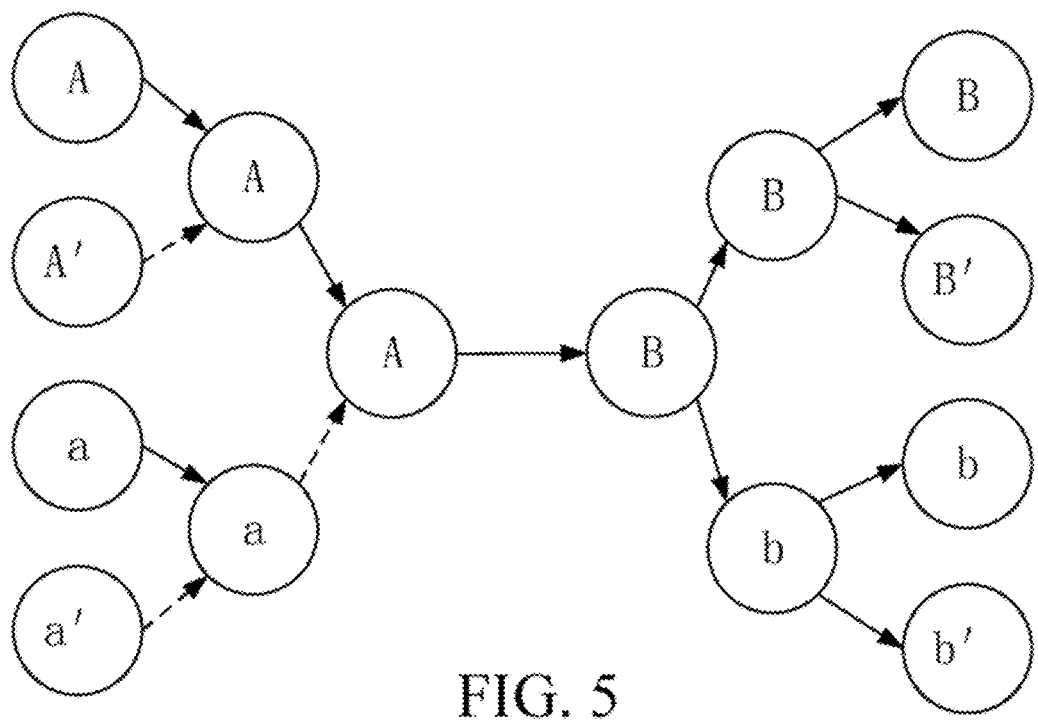
FIG. 5 is a schematic topology diagram of a service flow with a 4-layer protection superposition in an embodiment of the present disclosure.

FIG. 5 shows another embodiment of a superposition structure of a higher order protection group with a lower order protection group provided in the present disclosure. For a unidirectional traffic, point A is a source point, point B is a destination point. Point A is protected by a lower order protection group (working channel A, protection channel a); the working channel point A and the protection channel point a in the lower order protection group are protected by respective higher order protection groups: (working channel A, protection channel A') and (working channel a, protection channel a'). Similarly, point B is protected by a lower order protection group (working channel B, protection channel b); the working channel point B and the protection channel point b in the protection group are further protected by higher order protection groups respectively: (working channel B, protection channel B'), and (working channel b, protection channel b').

It can be seen from FIG. 5 that, for the unidirectional traffic, the traffic from the source point A is broadcasted to four destination points: point B, point B', point b, and point b', and the traffic has four candidate source points: point A, point A', point a, and point a'. One logic source point should be selected as a traffic source end according to an actual switching state of each protection group.

Figure 6:
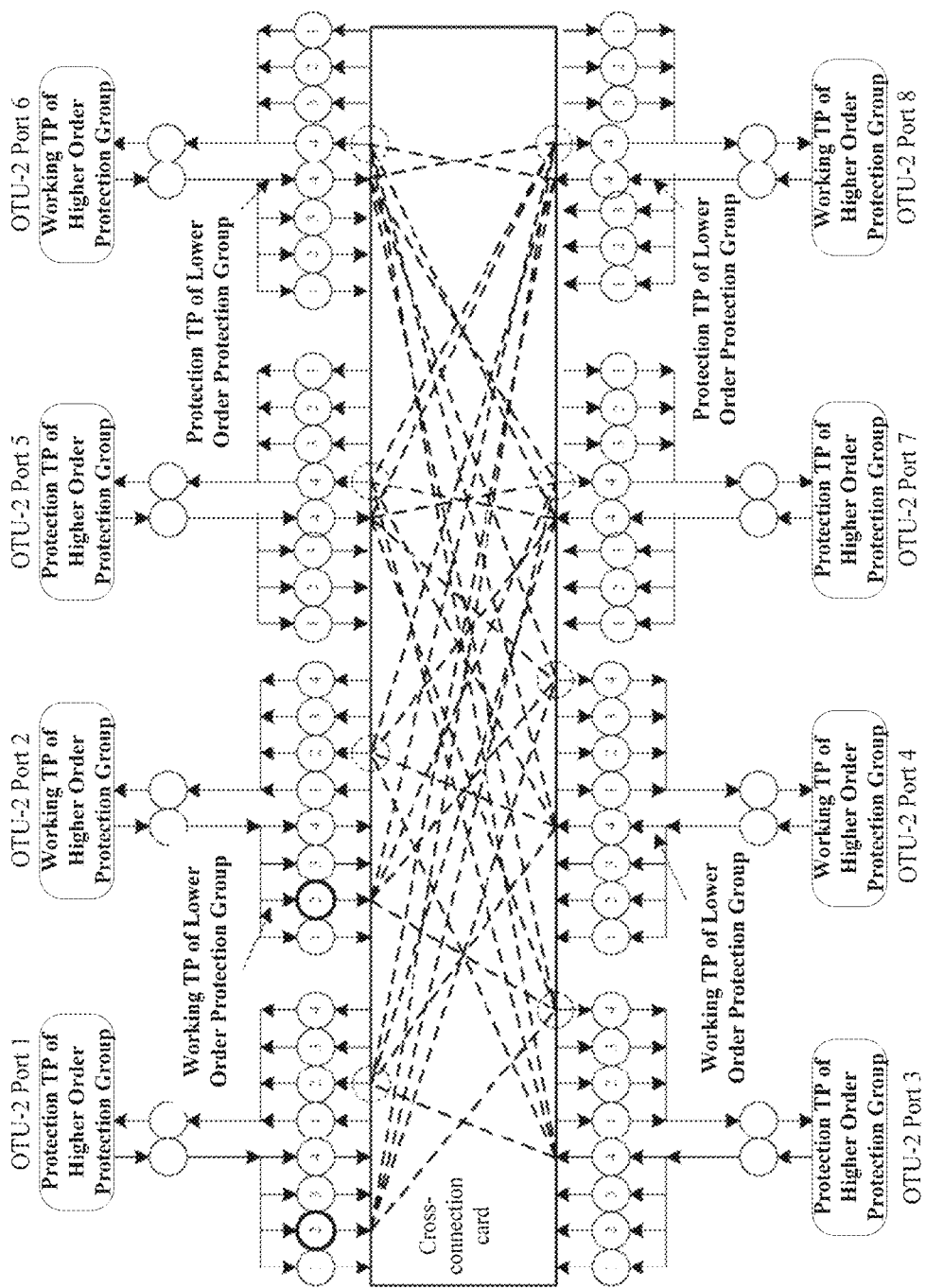
FIG. 6 shows a bridging and selective receiving path model used by a cross-connection card to implement a 4-layer protection superposition in an embodiment of the present disclosure.

FIG. 6 is a schematic diagram showing that the superposition structure of the higher order protection group with the lower order protection group provided in the present disclosure implements the implementation solution on the cross-connection card in the embodiment shown in FIG. 2. A user creates a bidirectional cross connection from an OTU-2 port 2ODU1 #2 to an OTU-2 port 4ODU1 #4, and creates the following protection groups:

higher order ODU2 protection group #1 (working channel: OTU-2 port 2, protection channel: OTU-2 port 1);

higher order ODU2 protection group #2 (working channel: OTU-2 port 4, protection channel: OTU-2 port 3);

higher order ODU2 protection group #3 (working channel: OTU-2 port 6, protection channel: OTU-2 port 5); and higher order ODU2 protection group #4 (working channel: OTU-2 port 8, protection channel: OTU-2 port 7).

The user also creates the following protection groups:

lower order ODU1protection group #1 (working channel: OTU-2 port 2 ODU1 #2, protection channel: OTU-2 port 6ODU1 #4); and lower order ODU1protection group #2 (working channel: OTU-2 port 4 ODU1 #4, protection channel: OTU-2 port 8 ODU1 #4).

FIG. 7 is a schematic structural diagram of an optical communication control device for specifically implementing a computation process of superposition switching of the foregoing protection groups. The optical communication control device can be a more specific embodiment implemented based on the optical communication device in the embodiment shown in FIG. 2.

In this embodiment, the optical communication control device comprises FPGA communicatively connected to a cross-connection chip and one or more optical communication units in an optical communication device. The cross-connection chip is configured to perform traffic cross-connection of the optical communication units (such as framers). Certainly, traffic cross-connection may also be implemented by other solutions in other embodiments, which is not limited to this embodiment.

The FPGA implements a plurality of protection state machines on the cross-connection cards. Each protection state machine is associated with at least one of the protection groups. Preferably, the FPGA is integrated on the cross-connection card of the optical communication device. Therefore, in other embodiments, based on the optical communication device according to the embodiment shown in FIG. 2, the present disclosure can also provide an embodiment of an optical communication device that integrates the FPGA with a cross-connection card.

FIG. 8 shows a protection group superposition switching method implemented based on an FPGA in an embodiment. The method comprises the following steps:

Step S1: Each protection state machine independently performs an APS protocol operation for at least one protection group that is pre-associated with the protection state machine.

In an embodiment of the present disclosure, a result of the APS protocol operation comprises: a protection switching state of each protection group; a transmitting APS byte to be sent to a remote network element device and representing that an APS byte protocol state of a local network element device has been updated; a switching result of a protection switching operation that needs to be performed on traffic affected by a failure.

Referring to FIG. 7 in combination, it can be known that the FPGA detects switching trigger information of the communication units (that is, framers) through an HAPS hardware bus. The switching trigger information comprises fault state information or APS byte information that has been changed. When the switching trigger information is detected, the FPGA can know traffic information related to the switching trigger information and send a packet through the hardware bus to inform a protection state machine corresponding to a protection group related to the traffic information, so that the protection state machine performs the APS protocol operation by using a switching trigger condition obtained according to the switching trigger information, thereby obtaining a result of the APS protocol operation. The switching trigger condition may be fault state information of a working port or protection port of a local or remote network element device.

In an embodiment of the present disclosure, the result of the APS protocol operation may be computed by the protection state machine or obtained by lookup a table. The table lookup method, for example, may be as follows:

a) Providing a first lookup table for comparing with a switching trigger condition of a local network element device. The first lookup table may be a two-dimensional array with fault states of the local working port and protection port, and an external command as coordinates, then comparing the priorities according to a sequence stipulated in the protocol, and the output result is a local highest-priority request.

b) Providing a second lookup table for comparing with a switching trigger condition related to local network element and remote network element devices (that is, the optical communication devices in the OTN are used as network elements). The second lookup table is a two-dimensional array with the local highest-priority request outputted in step a and a remote request from a remote network element as coordinates, and the comparison criterion is the same as that in step a. If a local request and a remote request have identical priorities and identical channel numbers, the remote request is prioritized, and the output result is a current highest-priority request of the protection state machine.

c) Providing a third lookup table for a protection state machine switching result. An input condition of the third lookup table is the current highest-priority request that is outputted in step b through looking up the second lookup table, the channel number of the remote request, and the channel number of the local request. When the channel numbers of the two requests are the same, switch to the protection channel; otherwise, switch to a working channel. The result of the switching is a state that the protection group should enter.

d) Further providing a fourth lookup table and a fifth lookup table which are similar to the third lookup table. The fourth lookup table uses the current highest-priority request outputted by the second lookup table as an input and is used for searching for a protection state machine bridging result. The fifth lookup table is used for looking up for a transmitting APS byte.

e) According to the obtained switching trigger condition, searching the first lookup table compared with a local input condition, to obtain a local highest-priority request; then search the second lookup table compared with local and remote input conditions, to obtain a current highest-priority request; next, separately searching the third lookup table for a protection state machine bridging result, the fourth lookup table for a switching result, and the fifth lookup table for a transmitting APS byte, to obtain all the output results.

Step S2: The FPGA updates, according to a result of the APS protocol operation, at least one protection status table for recording a status of each protection group, and updates, according to the protection status table, a cross-connection table for traffic cross-connection between communication units.

In an embodiment of the present disclosure, the cross-connection table stores a plurality of cross-connection records, each cross-connection record corresponds to traffic from a source point to a destination point. The source point and the destination point are communication units. The cross-connection record comprises a corresponding source point field and a corresponding destination point field. Content of the source point field is index information of the source point, and content of the destination point field is index information of the destination point.

For example, FIG. 9 is a schematic diagram of a cross-connection table in an embodiment. Traffic cross-connection from point A to point B is a row of cross-connection records in the cross-connection table; the source point field of the cross-connection record is filled by the index of point A, and the destination point field is filled by the index of point B.

The protection status table stores protection group records of higher order protection groups and lower order protection groups related to source points and destination points of at least some of the traffic. Higher order or lower order protection group each comprises a working channel and a protection channel. Each protection group record comprises a working channel field, a protection channel field, and a protection switching status field of a protection group. Content of the working channel field and content of the protection channel field are indexes of communication units corresponding to the working channel and the protection channel, respectively. Content of the protection switching status field is information of the working channel or the protection channel which the corresponding protection group currently works on.

In an embodiment of the present disclosure, a higher order protection status table can be established to record only status information of the higher order protection groups; and a lower order protection status table can be established to record only status information of the lower order protection groups. By setting the protection tables separately, it helps reduce computation of table lookup. Certainly, the protection table may be only one in other embodiments according to actual conditions.

For example, FIG. 10 is a schematic diagram of a protection status table for displaying status information of lower order protection groups in an embodiment. A protection group formed by a working channel point A and a protection channel point a is a row of record in the protection status table; content of the working channel field of this record is the index of point A, and content of the protection channel field is the index of point a. The record further has a switching status field that represents a current protection switching state of the protection group. The content of this field may be "working channel" or "protection channel", and is filled out by the protection state machine according to the result of the APS protocol operation. If the traffic of the protection group works on the working channel currently, the protection state machine modifies the content of the switching status field in the protection status table to be "working channel". If the traffic of the protection group works on the protection channel currently, the protection state machine modifies the switching status in the protection status table to be "protection channel", and further updates the actual cross-connection table according to the following steps.

Similarly, FIG. 11 is a schematic diagram of a higher order protection status table, which shows status information of four higher order protection groups.

A process of a method for updating the cross-connection table with reference to the protection status table is illustrated below. The method includes:

performing the following processing to each cross-connection record in the cross-connection table:

Step S10: Checking an index of the destination point in the content of the destination point field in the cross-connection record.

Step S20: Checking whether the destination point in step S10 belongs to a higher order protection group.

Step S30: If the destination point in step S10 does not belong to any higher order protection group, setting the destination point as a logic destination point, and proceeding to step S60 to continue processing.

Step S40: If the destination point in step S10 belongs to a higher order protection group and the index of the destination point is the same as the content of the working channel field of the higher order protection group, setting the destination point as a logic destination point, and proceeding to step S60 to continue processing.

Step S50: If the destination point in step S10 belongs to a higher order protection group and the index of the destination point is the same as the content of the protection channel field of the higher order protection group, setting the communication unit corresponding to the working channel in the higher order protection group as a logic destination point according to the protection status table, and proceeding to step S60 to continue processing.

Step S60: checking whether the logic destination point specified in step S30, step S40 or step S50 belongs to a lower order protection group Step S70: If the logic destination point specified in step S30, step S40 or step S50 does not belong to any lower order protection group, keeping the logic destination point unchanged, and proceeding to step S100 to continue processing Step S80: If the logic destination point in step S30, step S40 or step S50 belongs to a lower order protection group and the index of the logic destination point is the same as the working channel field of the lower order protection group, keeping the logic destination point unchanged, and proceeding to step S100 to continue processing Step S90: If the logic destination point specified in step S30, step S40 or step S50 belongs to a lower order protection group and the index of the logic destination point is the same as the content of the protection channel field of the lower order protection group, setting the communication unit corresponding to the working channel in the lower order protection group as a logic destination point, and proceeding to step S100 to continue processing.

Step S100: checking whether the logic destination point specified in step S70, step S80 or step S90 is the same as the destination point of any cross-connection record in the cross-connection table.

Step S110: If the logic destination point in step S70, step S80 or step S90 is not the same as the destination point of any cross-connection record, and returning to step S10 to continue to process a next cross-connection record without updating the cross-connection table.

Step S120: If the logic destination point specified in step S70, step S80 or step S90 is the same as the destination point of a particular cross-connection record, setting the source point in the particular cross-connection record as a logic source point, and proceeding to step S130 to continue processing.

Step S130: checking whether the logic source point in step S120 belongs to a lower order protection group.

Step S140: If the logic source point in step S120 does not belong to any lower order protection group, keeping the logic source point unchanged, and proceeding to step S170 to continue processing.

Step S150: If the logic source point specified in step S120 belongs to a lower order protection group and the traffic of the lower order protection group is passing through a working channel or protection channel corresponding to the logic source point specified in step S120, keeping the logic source point unchanged, and proceeding to step S170 to continue processing.

Step S160: If the logic source point specified in step S120 belongs to a lower order protection group but the traffic of the lower order protection group does not pass through the working channel or protection channel corresponding to the logic source point in step S120, setting a communication unit corresponding to a working channel or protection channel currently used by the traffic of the lower order protection group as a logic source point, and proceeding to step S170 to continue processing.

Step S170: checking whether the logic source point specified in step S140, step S150 or step S160 belongs to a higher order protection group.

Step S180: If the logic source point specified in step S140, step S150 or step S160 does not belong to any higher order protection group, keeping the logic source point unchanged, and proceeding to step S210 to continue processing.

Step S190: If the logic source point in step S140, step S150 or step S160 belongs to a higher order protection group and the traffic of the higher order protection group is passing through a working channel or protection channel corresponding to the logic source point in step S140, step S150 or step S160, keeping the logic source point unchanged, and proceeding to step S210 to continue processing Step S200: If the logic source point in step S140, step S150 or step S160 belongs to a higher order protection group but the traffic of the higher order protection group does not pass through the working channel or protection channel corresponding to the logic source point in step S140, step S150 or step S160, setting a communication unit corresponding to a working channel or protection channel that the higher order protection group currently works on as a logic source point, and proceeding to step S210 to continue processing.

Step S210: Using the logic source point in step S180, step S190 or step S200 as an actual source point corresponding to the destination point in step S10, and updating the corresponding cross-connection record in the cross-connection table according to the actual source point.

The principle of the foregoing method for updating the cross-connection table is then described with reference to FIG. 12.

It can be seen from the cross-connection table that, an unidirectional cross connection has a source point B and a destination point A.

First, the higher order protection status table is first looked up for a higher order protection group comprising the destination point A. The result is that there is a higher order protection group #1 in which point A is a working channel; therefore, a logic destination point is A.

Then, the lower order protection status table is looked up for a lower order protection group comprising the logic destination point A. The result is that there is a lower order protection group #1 in which point A is a working channel; therefore, the logic destination point is still A.

The cross-connection table is looked up for a cross-connection record comprising the logic destination point A. The result is that there is traffic #2 that uses point A as a destination point; point B is set as a logic source point.

The lower order protection status table is looked up for a lower order protection group comprising the logic source point B. The result is that there is a lower order protection group #2 in which the traffic currently works on a protection channel b; therefore, point b is set as the logic source point.

The higher order protection status table is looked up for a higher order protection group comprising the logic source point B. The result is that there is a higher order protection group #4 in which the traffic currently works on a working channel b; therefore, the logic source point is still point b.

Therefore, for the unidirectional cross connection, the destination point is point A and the source point is point b. The cross-connection table is updated with this operation result.

It can be seen that, in the whole table lookup process, an index of the destination point of a cross connection or protection group is used as an index of the cross connection or protection group. A search operation in the algorithm accomplishes a table reading operation using the destination point as an index. The table reading operation can be completed by using one addressing instruction. The time it takes is unrelated to the length of the content of the table and is a constant value in microsecond-level.

The foregoing manner implements the protection switching superposition function on hardware and can greatly improve the superposition protection switching performance. The switching time is reduced to several milliseconds, and the protection switching performance is greatly improved.

Step S3: The FPGA configures the updated cross-connection table into the cross-connection chip, so that the protection switching performance performs traffic cross-connection according to the updated cross-connection table.

Referring to FIG. 7, the FPGA configures the cross-connection table into the cross-connection chip, thereby creating a physical traffic cross-connection path on hardware.

In conclusion, according to the protection group superposition switching method, the control apparatus, and the optical communication device provided in the present disclosure, a plurality of protection state machines are implemented by using an FPGA. Each protection state machine independently performs an APS protocol operation for at least one protection group that is pre-associated with the protection state machine. At least one protection status table for recording a status of each protection group is updated according to a result of the APS protocol operation, and a cross-connection table for traffic cross-connection between communication units is updated according to the protection status table; the updated cross-connection table is configured into a cross-connection chip, so that the cross-connection chip performs traffic cross-connection according to the updated cross-connection table. In the present disclosure, a protection switching superposition function on hardware is implemented by using an FPGA, and in a traffic cross-connection process, a cross-connection chip can use a destination point as an index for reading a protection status table and a cross-connection table, so that a switching time is reduced to several milliseconds, thereby greatly improving the protection switching performance.

The present disclosure effectively overcomes various disadvantages in the prior art and hence has high industrial use value. The foregoing embodiments are only to illustrate the principle and efficacy of the present disclosure exemplarily, and are not to limit the present disclosure. Any person skilled in the art can make modifications or variations on the foregoing embodiments without departing from the spirit and scope of the present disclosure. Accordingly, all equivalent modifications or variations completed by those with ordinary skill in the art without departing from the spirit and technical thinking disclosed by the present disclosure should fall within the scope of claims of the present disclosure.

What is claimed is:

1. A protection group superposition switching method, implemented on a field programmable gate array (FPGA), wherein the FPGA is communicatively connected to a cross-connection chip and a plurality of optical communication units in an optical communication device; the cross-connection chip is configured to perform traffic cross-connection for the plurality of optical communication units; a plurality of protection groups are formed between the plurality of communication units and each of the communication units of other optical communication devices; the protection groups comprise a higher order protection group and a lower order protection group; the lower order protection group and the higher order protection group are superimposed to protect the same traffic, and the higher order protection group has priority over the lower order protection group; the FPGA communicates with a plurality of protection state machines, and each protection state machine is associated with at least one of the protection groups; the method comprises:

independently performing, by each protection state machine, an automatic protection switching (APS) protocol operation for the at least one protection group pre-associated with the protection state machine;

updating, according to a result of the APS protocol operation, at least one protection status table for recording a status of each protection group, and updating, according to the protection status table, a cross-connection table for traffic cross-connection between communication units;

wherein the cross-connection table stores a plurality of cross-connection records, and each cross-connection record corresponds to traffic from a source point to a destination point; the source point and the destination point are communication units; the cross-connection record comprises a source point field and a corresponding destination point field; content of the source point field is index information of the source point, and content of the destination point field is index information of the destination point;

the protection status table stores protection group records of higher order protection groups and lower order protection groups related to source points and destination points of at least some of traffic; each higher order or lower order protection group comprises a working channel and a protection channel; each protection group record comprises a working channel field, a protection channel field, and a protection switching status field of a protection group;

content of the working channel field and content of the protection channel field are indexes of communication units corresponding to the working channel and the protection channel, respectively; content of the protection switching status field is information that the corresponding protection group currently works on the working channel or the protection channel; and configuring the updated cross-connection table into the cross-connection chip, so that the cross-connection chip performs traffic cross-connection according to the updated cross-connection table.

2. The protection group superposition switching method according to claim 1, wherein a method for updating the cross-connection table comprises:

performing the following processing corresponding to each cross-connection record in the cross-connection table:

stepS10, checking an index of the destination point in the content of the destination point field in the cross-connection record;

stepS20, checking whether the destination point in step S10 belongs to a higher order protection group;

step S30, if the destination point in step S10 does not belong to any higher order protection group, setting the destination point as a logic destination point, and proceeding to step S60 to continue processing;

step S40, if the destination point in step S10 belongs to the higher order protection group and the index of the destination point is the same as the content of the working channel field of the higher order protection group, setting the destination point as a logic destination point, and proceeding to step S60 to continue processing;

step S50, if the destination point in step S10 belongs to the higher order protection group and the index of the destination point is the same as the content of the protection channel field of the higher order protection group, setting the communication unit corresponding to the working channel in the higher order protection group as a logic destination point according to the protection status table, and proceeding to step S60 to continue processing;

stepS60, checking whether the logic destination point in step S30, step S40 or step S50 belongs to a lower order protection group;

step S70, if the logic destination point in step S30, step S40 or step S50 does not belong to any lower order protection group, keeping the logic destination point unchanged, and proceeding to step S100 to continue processing;

step S80, if the logic destination point in step S30, step S40 or step S50 belongs to the lower order protection group and the index of the logic destination point is the same as the content of the working channel field of the lower order protection group, keeping the logic destination point unchanged, and proceeding to step S100 to continue processing;

step S90, if the logic destination point in step S30, step S40 or step S50 belongs to the lower order protection group and the index of the logic destination point is the same as the content of the protection channel field of the lower order protection group, setting the communication unit corresponding to the working channel in the lower order protection group as a logic destination point, and proceeding to step S100 to continue processing;

step S100, checking whether the logic destination point in step S70, step S80 or step S90 is the same as the destination point of any cross-connection record in the cross-connection table;

step S110, if the logic destination point in step S70, step S80 or step S90 is not the same as the destination point of any cross-connection record, returning to step S10 to continue to process a next cross-connection record without updating the cross-connection table;

step S120, if the logic destination point in step S70, step S80 or step S90 is the same as the destination point of a particular cross-connection record, setting the source point in the particular cross-connection record as a logic source point, and proceeding to step S130 to continue processing;

stepS130, checking whether the logic source point in step S120 belongs to a lower order protection group;

step S140, if the logic source point in step S120 does not belong to any lower order protection group, keeping the logic source point unchanged, and proceeding to step S170 to continue processing;

step S150, if the logic source point in step S120 belongs to the lower order protection group and the traffic of the lower order protection group is passing through a working channel or protection channel corresponding to the logic source point instep S120, keeping the logic source point unchanged, and proceeding to step S170 to continue processing;

step S160, if the logic source point in step S120 belongs to the lower order protection group but the traffic of the lower order protection group does not pass through the working channel or protection channel corresponding to the logic source point in step S120, setting a communication unit corresponding to a working channel or protection channel currently used by the traffic of the lower order protection group as a logic source point, and proceeding to step S170 to continue processing;

step S170, checking whether the logic source point in step S140, step S150 or step S160 belongs to a higher order protection group;

step S180, if the logic source point in step S140, step S150 or step S160 does not belong to any higher order protection group, keeping the logic source point unchanged, and proceeding to step S210 to continue processing;

step S190, if the logic source point specified in step S140, step S150 or step S160 belongs to the higher order protection group and the traffic of the higher order protection group is passing through a working channel or protection channel corresponding to the logic source point in step S140, step S150 or step S160, keeping the logic source point unchanged, and proceeding to step S210 to continue processing;

step S200, if the logic source point in step S140, step S150 or step S160 belongs to the higher order protection group but the traffic of the higher order protection group does not pass through the working channel or protection channel corresponding to the logic source point in step S140, step S150 or step S160, setting a communication unit corresponding to a working channel or protection channel that the higher order protection group currently works on as a logic source point, and proceeding to step S210 to continue processing; and step S210, using the logic source point specified in step S180, step S190 or step S200 as an actual source point corresponding to the destination point in step S10, and updating the corresponding cross-connection record in the cross-connection table according to the actual source point.

3. The protection group superposition switching method according to claim 1, wherein the result of the APS protocol operation comprises:

A protection switching state of each protection group;

A transmitting APS byte to be sent to a remote network element device and representing that an APS byte protocol state of a local network element device has been updated; and a switching result of a protection switching operation that needs to be performed on traffic affected by a fault.

4. The protection group superposition switching method according to claim 1, wherein the protection state machines separately look up one or more pre-stored tables for APS protocol operation results pre-associated with switching trigger conditions that possibly affect the related protection groups.

5. The protection group superposition switching method according to claim 1, comprising: detecting, by the FPGA, switching trigger information of plurality of communication units, obtaining related traffic information when the switching trigger information is detected, and sending a packet through a hardware bus to inform a protection state machine corresponding to a protection group related to the traffic information, so that the protection state machine performs the APS protocol operation by using a switching trigger condition obtained according to the switching trigger information.

6. The protection group superposition switching method according to claim 5, wherein the switching trigger information comprises fault state information or APS byte information that has been changed.

7. The protection group superposition switching method according to claim 1, wherein the optical communication device is a framer.

8. An optical communication device using the protection group superposition switching method of claim 1.

9. A control apparatus for protection group superposition switching, comprising:

a field programmable gate array (FPGA);

wherein the FPGA is communicatively connected to a cross-connection chip and a plurality of optical communication units in an optical communication device; the cross-connection chip is configured to perform traffic cross-connection for the plurality of optical communication units; a plurality of protection groups are formed between the plurality of communication units and each of the communication units of other optical communication devices; the protection groups comprise a higher order protection group and a lower order protection group; the lower order protection group and the higher order protection group are superimposed to protect the same traffic, and the higher order protection group has priority over the lower order protection group; the FPGA communicates with a plurality of protection state machines, and each protection state machine is associated with at least one of the protection groups;

each protection state machine independently performs an automatic protection switching (APS) protocol operation for the at least one protection group pre-associated with the protection state machine; updates, according to a result of the APS protocol operation, at least one protection status table for recording a status of each protection group, and updates, according to the protection status table, a cross-connection table for traffic cross-connection between communication units; and configures the updated cross-connection table into the cross-connection chip, so that the cross-connection chip performs traffic cross-connection according to the updated cross-connection table;

wherein the cross-connection table stores a plurality of cross-connection records, and each cross-connection record corresponds to traffic from a source point to a destination point; the source point and the destination point are communication units; the cross-connection record comprises a source point field and a corresponding destination point field; content of the source point field is index information of the source point, and content of the destination point field is index information of the destination point; and the protection status table stores protection group records of higher order protection groups and lower order protection groups related to source points and destination points of at least some of traffic; each higher order or lower order protection group comprises a working channel and a protection channel; each protection group record comprises a working channel field, a protection channel field, and a protection switching status field of a protection group;
content of the working channel field and content of the protection channel field are indexes of communication units corresponding to the working channel and the protection channel, respectively; content of the protection switching status field is information that the corresponding protection group currently works on the working channel or the protection channel.

10. The control apparatus for protection group superposition switching according to claim 9, wherein a method for updating the cross-connection table comprises:
performing the following processing corresponding to each cross-connection record in the cross-connection table:
stepS10, checking an index of a destination point in the content of the destination point field in the cross-connection record;
stepS20, checking whether the destination point in step S10 belongs to a higher order protection group;
step S30, if the destination point in step S10 does not belong to any higher order protection group, setting the destination point as a logic destination point, and proceeding to step S60 to continue processing;
step S40, if the destination point in step S10 belongs to the higher order protection group and the index of the destination point is the same as the content of the working channel field of the higher order protection group, setting the destination point as a logic destination point, and proceeding to step S60 to continue processing;
step S50, if the destination point in step S10 belongs to the higher order protection group and the index of the destination point is the same as the content of the protection channel field of the higher order protection group, setting the communication unit corresponding to the working channel in the higher order protection group as a logic destination point according to the protection status table, and proceeding to step S60 to continue processing;
stepS60, checking whether the logic destination point in step S30, step S40 or step S50 belongs to a lower order protection group;
step S70, if the logic destination point in step S30, S40 or step S50 does not belong to any lower order protection group, keeping the logic destination point unchanged, and proceeding to step S100 to continue processing;
step S80, if the logic destination point in step S30, step S40 or step S50 belongs to the lower order protection group and the index of the logic destination point is the same as the content of the working channel field of the lower order protection group, keeping the logic destination point unchanged, and proceeding to step S100 to continue processing;
step S90, if the logic destination point in step S30, step S40 or step S50 belongs to the lower order protection group and the index of the logic destination point is the same as the content of the protection channel field of the lower order protection group, setting the communication unit corresponding to the working channel in the lower order protection group as a logic destination point, and proceeding to step S100 to continue processing;
step S100, checking whether the logic destination point in step S70, step S80 or step S90 is the same as the destination point of any cross-connection record in the cross-connection table;
step S110, if the logic destination point in step S70, step S80 or step S90 is not the same as the destination point of any cross-connection record, and returning to step S10 to continue to process a next cross-connection record without updating the cross-connection table;
step S120, if the logic destination point in step S70, step S80 or step S90 is the same as the destination point of a particular cross-connection record, setting the source point in the particular cross-connection record as a logic source point, and proceeding to step S130 to continue processing;
stepS130, checking whether the logic source point in step S120 belongs to a lower order protection group;
step S140, if the logic source point in step S120 does not belong to any lower order protection group, keeping the logic source point unchanged, and proceeding to step S170 to continue processing;
step S150, if the logic source point in step S120 belongs to the lower order protection group and the traffic of the lower order protection group is passing through a working channel or protection channel corresponding to the logic source point in step S120, keeping the logic source point unchanged, and proceeding to step S170 to continue processing;
step S160, if the logic source point in step S120 belongs to the lower order protection group but the traffic of the lower order protection group does not pass through the working channel or protection channel corresponding to the logic source point in step S120, setting a communication unit corresponding to a working channel or protection channel currently used by the traffic of the lower order protection group as a logic source point, and proceeding to step S170 to continue processing;
step S170, checking whether the logic source point specified in step S140, step S150 or step S160 belongs to a higher order protection group;
step S180, if the logic source point in step S140, step S150 or step S160 does not belong to any higher order protection group, keeping the logic source point unchanged, and proceeding to step S210 to continue processing;
step S190, if the logic source point specified in step S140, step S150 or step S160 belongs to the higher order protection group and the traffic of the higher order protection group is passing through a working channel or protection channel corresponding to the logic source point specified in step S140, step S150 or step S160, keeping the logic source point unchanged, and proceeding to step S210 to continue processing;
step S200, if the logic source point specified in step S140, step S150 or step S160 belongs to the higher order protection group but the traffic of the higher order protection group does not pass through the working channel or protection channel corresponding to the logic source point specified in step S140, step S150 or step S160, setting a communication unit corresponding to a working channel or protection channel that the higher order protection group currently works on as a logic source point, and proceeding to step S210 to continue processing; and
step S210, using the logic source point specified in step S180, step S190 or step S200 as an actual source point corresponding to the destination point in step S10, and updating the corresponding cross-connection record in the cross-connection table according to the actual source point.

11. The control apparatus for protection group superposition switching according to claim 9, wherein the result of the APS protocol operation comprises:

A protection switching state of each protection group;

a transmitting APS byte to be sent to a remote network element device and representing that an APS byte protocol state of a local network element device has been updated; and a switching result of a protection switching operation that needs to be performed on traffic affected by a fault.

12. The control apparatus for protection group superposition switching according to claim 9, wherein the protection state machines separately look up one or more pre-stored tables for APS protocol operation results pre-associated with switching trigger conditions that possibly affect the related protection groups.

13. The control apparatus for protection group superposition switching according to claim 9, wherein the FPGA detects switching trigger information of plurality of communication units, obtains related traffic information when the switching trigger information is detected, and sends a packet through a hardware bus to inform a protection state machine corresponding to a protection group related to the traffic information, so that the protection state machine performs the APS protocol operation by using a switching trigger condition obtained according to the switching trigger information.

14. The control apparatus for protection group superposition switching according to claim 13, wherein the switching trigger information comprises: fault state information or APS byte information that has been changed.

15. The control apparatus for protection group superposition switching according to claim 9, wherein the optical communication device is a framer.

* * * * *